United States Patent [19]
Gross et al.

[11] Patent Number: 6,118,918
[45] Date of Patent: *Sep. 12, 2000

[54] CONFIGURATION FOR TRANSMITTING LIGHT BETWEEN TWO LOCATIONS AT DIFFERENT ELECTRIC POTENTIALS, AND METHOD OF PRODUCING SUCH A CONFIGURATION

[75] Inventors: Walter Gross, Herzogenaurach; Stefan Hain, Effeltrich; Norbert Koch, Köln, all of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/213,728

[22] Filed: Dec. 17, 1998

Related U.S. Application Data

[63] Continuation of application No. PCT/DE97/01078, May 28, 1997.

[30] Foreign Application Priority Data

Jun. 17, 1996 [DE] Germany .................. 196 24 091

[51] Int. Cl.⁷ ........................................ G02B 6/46
[52] U.S. Cl. ........................ 385/138; 385/139; 385/147
[58] Field of Search ........................... 385/138, 139, 385/147

[56] References Cited

U.S. PATENT DOCUMENTS

| | | | |
|---|---|---|---|
| 4,409,428 | 10/1983 | Dey et al. | 174/43 |
| 4,563,545 | 1/1986 | Dzomba | 174/152 R |
| 4,984,860 | 1/1991 | Seike et al. | 385/147 |
| 5,090,793 | 2/1992 | Seike et al. | 385/100 |

FOREIGN PATENT DOCUMENTS

| | | |
|---|---|---|
| 0 265 737 B1 | 5/1988 | European Pat. Off. . |
| 29 01 872 | 7/1980 | Germany . |
| 300 495 A7 | 6/1992 | Germany . |
| 42 27 410 C1 | 11/1993 | Germany . |
| 94 13 136 | 11/1994 | Germany . |

OTHER PUBLICATIONS

"Manmade Materials" (Biederbick), 4$^{th}$ revised edition, Kamprath Series, Technology.

International Publication WO 80/00762 (McConnell), dated *Apr. 17, 1980*.

*Primary Examiner*—Rodney Bovernick
*Assistant Examiner*—Ellen Kim
*Attorney, Agent, or Firm*—Herbert L. Lerner; Laurence A. Greenberg; Werner H. Stemer

[57] ABSTRACT

A configuration includes a high voltage insulator, whose internal space accommodates optical waveguides and is filled with plastic foam, preferably a polyurethane foam.

6 Claims, 1 Drawing Sheet

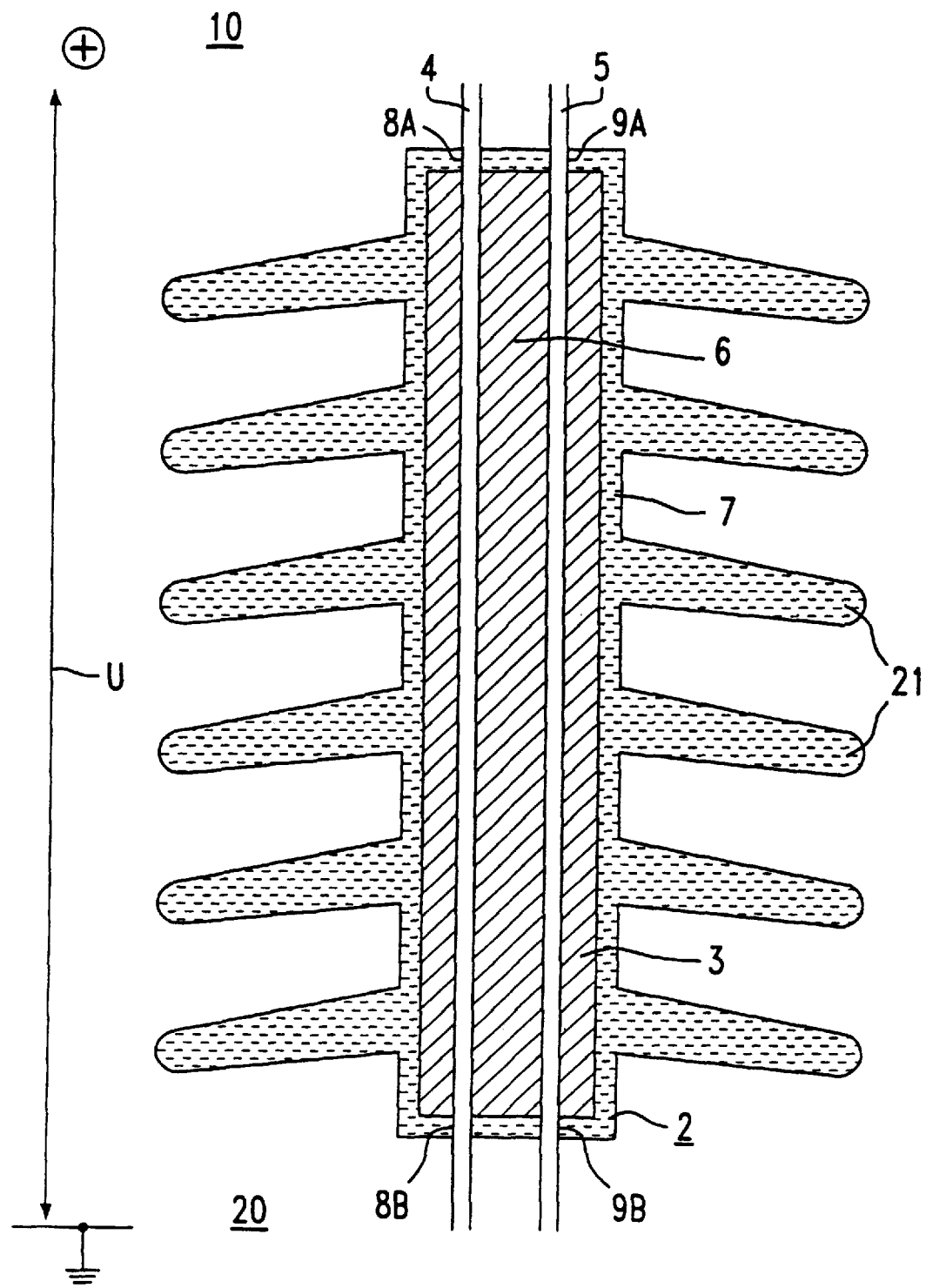

CONFIGURATION FOR TRANSMITTING LIGHT BETWEEN TWO LOCATIONS AT DIFFERENT ELECTRIC POTENTIALS, AND METHOD OF PRODUCING SUCH A CONFIGURATION

CROSS-REFERENCE TO RELATED APPLICATION

This application is a continuation of copending International Application No. PCT/DE97/01078, filed on May 28, 1997, which designated the United States.

BACKGROUND OF THE INVENTION

Field of the Invention

The invention relates to a configuration for transmitting light between two locations having different electric potentials. The invention further relates to a method of producing a configuration for transmitting light between two locations having different electric potentials.

In order to measure physical variables, such as electric current or electric voltage, for example, at a high voltage potential, the measured signals must be transmitted from sensors provided in order to measure the variables in a manner that is at a potential separated from earth potential. Potential-free transmission of the measured signals is possible, as is known, in the form of optical signals via optical waveguides, which are led from the high voltage potential to earth potential. Systems are also known in which, in addition to the measured signals, the power for the sensors that are located on the high voltage side is also transmitted optically via optical waveguides.

The optical waveguides have to be protected against mechanical stresses. Furthermore, for the electrical insulation, a sufficiently high electrical breakdown gap and generally also a sufficiently high electrical creep path between the high voltage side and the earth potential side must be ensured.

European Patent EP 0 265 737 B1 discloses a configuration for transmitting the measured signals of a current transformer at a high voltage potential to earth potential in the form of optical signals. The known configuration includes a tubular high voltage insulator running vertically from a current transformer to a base that is lying at earth potential. The insulator is made of ceramic or glass-fiber reinforced plastic (GRP), and one or more optical conductors in an optical conductor cable, which is led in a helix through an internal space of the high voltage insulator. The optical measured signals are transmitted via the optical conductors. The internal space of the high voltage insulator can be filled with air or with an insulating gas, such as nitrogen ($N_2$) or sulphur hexafluoride ($SF_6$). In another embodiment of this known configuration, the optical conductor cable is wound externally in a helix onto the insulator tube and embedded in a cast-on silicon layer or even completely covered by the silicon layer. In addition, silicon sheds to lengthen the surface creep path are formed with the silicon layer. In the case of the configuration disclosed by European Patent EP 0 265 737 B1, in the embodiment with insulating gas, the insulating gas must be refilled in the case of leaks, for example during mounting operations. In the case of the embedding of the optical conductor cable in silicon, problems may arise at the interface between the silicon and the optical conductor cable, as a result of thermal volume changes of the silicon during temperature changes. The volume changes can lead to longitudinal gaps in the silicon along the optical conductor cable, into which gaps moisture can penetrate. This can result in creeping discharges.

SUMMARY OF THE INVENTION

It is accordingly an object of the invention to provide a configuration for transmitting light between two locations at different electric potentials, and a method of producing such a configuration which overcome the above-mentioned disadvantages of the prior art devices and methods of this general type.

With the foregoing and other objects in view there is provided, in accordance with the invention, in combination with two locations having different potentials, a configuration for transmitting light between the two locations, including: a) an insulator having an internal space formed therein and disposed between the two locations having the different potentials; b) at least one optical waveguide led through the internal space of the insulator for transmitting the light; c) a plastic foam filling the internal space of the insulator and surrounding the at least one optical waveguide; d) sulphur hexafluoride gas being injected and foaming the plastic foam; and e) the plastic foam in a predefined operating temperature range being under a positive pressure above atmospheric pressure.

With the foregoing and other objects in view there is also provided, in accordance with the invention, a method for producing a configuration for transmitting light between two locations having different electric potentials, which includes: a) providing an insulator with an internal space formed therein and at least one optical waveguide for transmitting light; b) placing and laying the at least one optical waveguide through the internal space of the insulator; c) filling the internal space of the insulator with plastic foam and subsequently sealing the internal space after completing step b; d) foaming the plastic foam with a propellant which at least partly includes a sulphur hexafluoride gas; and e) applying a positive pressure above atmospheric pressure in the internal space of the insulator.

As a result of the filling of the internal space of the insulator with plastic foam, good electrical insulation of the two potential sides from each other is achieved, as is good mechanical protection of the at least one optical waveguide in the internal space of the insulator. In addition, for example for mounting and maintenance operations, the internal space of the insulator can also be opened for some time, that is to say the pressure-tightness can be temporarily dispensed with, since gas included in the plastic foam diffuses out only slowly.

Accordingly, in an advantageous embodiment of the production method, the internal space of the insulator is filled by introducing a plastic compound into the internal space of the insulator and then foaming the plastic compound, preferably with the aid of a propellant. The propellant is preferably composed, at least partially, of the electrically well-insulating sulphur hexafluoride gas ($SF_6$ gas). The plastic compound foamed with $SF_6$, gas has a particularly good breakdown resistance.

In a particularly advantageous embodiment, the plastic foam in the internal space of the insulator at least over a predefined operating temperature range, is under a positive pressure above atmospheric pressure (about 1 bar=$10^5$ Pa). As a result, the plastic foam is under mechanical stresses, which constitute an additional safeguard against the formation of longitudinal gaps in the internal space of the insulator. In the case of the production method, the plastic compound is correspondingly introduced into the internal space of the insulator already under a positive pressure above atmospheric pressure. As a result of the positive pressure when filling the plastic compound, the size of the gas bubbles in the foamed plastic and hence the density of the plastic foam can be adjusted. The positive pressure in the internal space of the insulator can be adjusted in particular by filling the internal space of the insulator with nitrogen gas.

A particularly advantageous plastic foam is polyurethane foam. A polyurethane compound is then correspondingly used as the plastic compound.

Other features which are considered as characteristic for the invention are set forth in the appended claims.

Although the invention is illustrated and described herein as embodied in a configuration for transmitting light between two locations at different electric potentials, and a method of producing such a configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, sectional view of an exemplary embodiment of a configuration for transmitting light between two locations at different electric potentials according to the invention.

DESCRIPTION OF THE PREFERRED EMBODIMENTS

Referring now to the single FIGURE of the drawing in detail, there is shown a first location, which is lying at an electric potential which is positive ("+") with respect to earth potential, is designated by reference numeral 10, and a second location lying at earth potential is designated by reference numeral 20. The potential difference (voltage) U prevailing between the two locations 10 and 20 is preferably a high voltage, that is to say typically greater than about 1 kV. Light is transmitted between the two locations 10 and 20 via optical waveguides, in particular individual optical fibers or optical conductor cables generally having a plurality of fibers, 4 and 5. Such an optical transmission path is advantageous for analogue or digital transmission of measured signals of at least one sensor (i.e. a transformer) which is located at the first location 10 at the high voltage potential, and is not shown, for measuring a physical variable at the first location 10. Such a sensor may supply, for example, measured signals for an electric current or an electric voltage in a current conductor lying at the high voltage potential, or else for a temperature. It is preferable if the first optical waveguide 4 is provided for the optical transmission of the measured signals from the non-illustrated sensor and the second optical waveguide 5 for the optical transmission of power for the sensor.

For the electrically safe insulated guidance of the optical waveguides 4 and 5 from the first location 10 to the second location 20 over the potential difference prevailing between the two locations 10 and 20, an electric insulator 2 is provided. The insulator 2 has an insulator housing (insulator fitting) 7, which surrounds an internal space 3 in a pressure-tight manner (hermetically). The insulator housing 7 includes a tubular carrier part and sheds 21, disposed one under another around the carrier part, in order to lengthen the surface creep path for electric creep currents. The entire insulator housing 7 may be composed of porcelain or else of a glass fiber-reinforced plastic, the sheds 21 also being able to be formed in particular from silicon gel (silicon).

At the upper end, facing the first location 10, of the insulator housing 7, provision is made in each case of a pressure-tight bushing 8A for the first optical waveguide 4 and 9A for the second optical waveguide 5. The optical waveguides 4 and 5 run through the bushings 8A and 9A through the insulator housing 7 into the internal space 3 of the insulator 2. The optical waveguides 4 and 5 run through the entire internal space 3 as far as the lower end, facing the second location 20, of the insulator housing 7. At this lower end of the insulator housing 7, once more two pressure-tight bushings 8B and 9B through the insulator housing 7 are provided, through which in each case one of the optical waveguides 4 or 5 is in turn led out of the internal space 3 into free space. The bushings 8A and 8B, and 9A and 9B may be O-ring seals or else openings sealed with silicon. The optical waveguides 4 and 5 can be disposed, as illustrated, substantially rectilinearly through the internal space 3 on essentially the shortest path between the two locations 10 and 20, but can also take another course, for example in the form of a helix or spiral.

The optical waveguides 4 and 5 are disposed in the internal space 3 within a plastic foam 6, with which the entire internal space 3 of the insulator 2 is filled. The plastic foam 6 fixes the optical waveguides 4 and 5 in their predefined course and completely surrounds the optical waveguides 4 and 5.

The plastic foam 6 is generally composed of one or more plastics with gas inclusions (pores, gas bubbles). For example, a polypropylene foam, a polyethylene foam, a polystyrene foam, a polyvinyl chloride foam or else a reactive resin foam, in particular a polyurethane foam, can be used as the plastic foam 6, which may in each case be produced in a known manner. In general, a plastic molding compound (in short: plastic compound) is foamed with the aid of a physical and/or a chemical propellant to form the plastic foam 6. In particular, the foaming may be supported by a propellant, for example nitrogen or a possibly halogenated hydrocarbon gas. A particularly advantageous plastic foam 6 is a plastic foam with $SF_6$, gas inclusions, which insulate electrically particularly well. To this end, the plastic compound is foamed using $SF_6$ as the propellant.

A suitable polyurethane compound for the plastic foam 6 is the product having the trade name GILBATHERM from the Rhemania company, which is preferably foamed with $SF_6$ gas.

The plastic foam 6 is preferably placed under a positive pressure, which lies above the normal air pressure at the site of the configuration. As a result, the plastic foam 6 and the optical waveguides 4 and 5, as well as the inner wall of the insulator housing 7, do not need to enter into any chemical bonds, since the formation of longitudinal gaps in the direction of the electric field between the two locations 10 and 20 is reliably avoided simply by the positive pressure and the mechanical stress effected thereby in the internal space 3.

In order to produce the configuration illustrated, the following method may be used:

In a first method step, the optical waveguides 4 and 5 are drawn into the internal space 3 of the insulator 2 through the bushings 8A and 8B, and 9A and 9B, and brought into the desired shape and position.

In a second method step, nitrogen under a predefined positive pressure with respect to atmospheric pressure (1 bar), for example under a pressure of 3 bar, is introduced into the internal space 3 of the insulator 2.

In a third method step, the remaining internal space 3, surrounding the optical waveguides 4 and 5, of the insulator 2 is filled with the plastic compound, for example a prepolymer compound and preferably a polyurethane molding compound, and foamed, preferably with $SF_6$ gas. The nitrogen escapes to a large extent during the foaming operation. The positive pressure that is set with the aid of the nitrogen serves to set a desired size and density of the gas inclusions in the plastic foam 6. In this case, the pressure is selected such that a slight positive pressure remains in the internal space 3 after the foaming operation.

In a fourth method step, the internal space 3 is sealed in a pressure-tight manner, in that an opening provided in the insulator housing 7 for the purpose of introducing the nitrogen and the plastic foam 6, and optionally also the bushings 8A, 8B, 9A and 9B, are closed in a pressure-tight manner.

We claim:

1. In combination with two locations having different potentials, a configuration for transmitting light between the two locations, comprising:
   a) an insulator having an internal space formed therein and disposed between the two locations having the different potentials;
   b) at least one optical waveguide disposed in and extending from said internal space of said insulator for transmitting the light;
   c) a plastic foam filling said internal space of said insulator completely and contacting said at least one optical waveguide;
   d) nitrogen gas being introduced into said internal space;
   e) sulphur hexafluoride gas being injected in and foaming said plastic foam;
   f) said plastic foam in a predefined operating temperature range being under a slight positive pressure above atmospheric pressure; and
   g) said plastic foam fixing said at least one optical waveguide in a predefined course; wherein
   h) said plastic foam has gas inclusions of a desired size and density determined by said nitrogen gas introduced before said plastic foam into said internal space under a predefined positive pressure with respect to atmospheric pressure.

2. The configuration according to claim 1, wherein said plastic foam is a polyurethane foam.

3. A method for producing a configuration for transmitting light between two locations having different electric potentials, which comprises:
   a) providing an insulator with an internal space formed therein and at least one optical waveguide for transmitting light;
   b) placing and laying the at least one optical waveguide through the internal space of the insulator;
   c) introducing nitrogen under a predefined positive pressure with respect to atmospheric pressure into the internal space of the insulator;
   d) filling the internal space of the insulator completely with plastic foam and contacting the at least one optical waveguide;
   e) foaming the plastic foam with a propellant which at least partly includes a sulphur hexafluoride gas and thereby introducing gas inclusions of a desired size and density in the plastic foam, whereby the size and the density are determined by the predefined positive pressure of the nitrogen
   such that a slight positive pressure above atmospheric pressure remains in the internal space of the insulator after the foaming operation;
   e) fixing the at least one optical waveguide in a predefined course with the plastic foam; and
   f) subsequently sealing the internal space.

4. The method according to claim 3, which comprises filling the internal space of the insulator with a plastic compound and foaming the plastic compound using the propellant.

5. The method according to claim 3, which comprises producing the positive pressure by filling the internal space of the insulator with nitrogen gas during step e.

6. The method according to claim 4, which comprises using a polyurethane compound as the plastic compound.

* * * * *